(12) United States Patent
Yin et al.

(10) Patent No.: US 9,584,369 B2
(45) Date of Patent: Feb. 28, 2017

(54) METHODS OF REPRESENTING SOFTWARE DEFINED NETWORKING-BASED MULTIPLE LAYER NETWORK TOPOLOGY VIEWS

(71) Applicant: Futurewei Technologies, Inc., Plano, TX (US)

(72) Inventors: Hongtao Yin, Fremont, CA (US); Shujin Zhang, San Carlos, CA (US); Xuesong Dong, Pleasanton, CA (US); Bisong Tao, San Jose, CA (US); Pinzhong Liu, Fremont, CA (US); Katherine Zhao, San Jose, CA (US); Lin Han, San Jose, CA (US); Xiaoyong Yi, Fremont, CA (US); Ming Li, Cupertino, CA (US); Yonghui Wu, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 531 days.

(21) Appl. No.: 13/802,297

(22) Filed: Mar. 13, 2013

(65) Prior Publication Data
US 2014/0280864 A1    Sep. 18, 2014

(51) Int. Cl.
*H04L 12/24* (2006.01)
*H04L 12/26* (2006.01)

(52) U.S. Cl.
CPC .............. *H04L 41/12* (2013.01); *H04L 43/08* (2013.01)

(58) Field of Classification Search
CPC ....................................................... H04L 12/36
USPC ........................................................... 709/224
See application file for complete search history.

(56) References Cited

U.S. PATENT DOCUMENTS

| | | | |
|---|---|---|---|
| 2013/0058340 A1* | 3/2013 | Lambeth | H04L 12/4633 370/392 |
| 2013/0060737 A1* | 3/2013 | Koponen | H04L 12/4633 707/634 |
| 2014/0201642 A1* | 7/2014 | Vicat-Blanc | H04L 41/22 715/736 |

* cited by examiner

*Primary Examiner* — David Lazaro
*Assistant Examiner* — Zia Khurshid
(74) *Attorney, Agent, or Firm* — Conley Rose, P.C.

(57) ABSTRACT

A method for network control, comprising receiving a request for a network view from an application at a Software Defined Network (SDN) controller, creating a network view from a network map, wherein the network map comprises a representation of a plurality of network devices and network paths in a SDN-based multiple layer network, and wherein the network view comprises at least a portion of the devices or paths in the network map, and sharing the network view with the application.

20 Claims, 5 Drawing Sheets

METHODS OF REPRESENTING SOFTWARE DEFINED NETWORKING-BASED MULTIPLE LAYER NETWORK TOPOLOGY VIEWS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Software-defined networks (SDN) have emerged as a promising new technology. In SDNs, network control is decoupled from forwarding and is directly programmable, e.g., by separating the control plane from the data plane and implementing the control plane using software applications and a centralized SDN controller, which may make the routing decisions and communicate these decisions to all the devices on the network. This migration from tightly bound individual network device control to control using accessible computing devices has enabled the underlying infrastructure to be abstracted for applications and network services, permitting treatment of the network as a logical or virtual entity.

SDN architecture networks may be divided into multiple logical layers: networking devices (e.g., routers, switches, servers, etc.), Networking Operating Systems (NOSs), SDN controllers, and user applications. SDN controllers are software modules built over NOS in network systems, and may provide platforms for users to write applications and services via Application Programming Interfaces (APIs). One goal of SDNs is to simplify the existing network software systems and provide an open platform for developing user applications. However, present SDN architectures do not efficiently utilize the limited network resources.

SUMMARY

In one aspect, the disclosure includes a method for network control, comprising receiving a request for a network view from an application at an SDN controller, creating a network view from a network map, wherein the network map comprises a representation of a plurality of network devices and network paths in a SDN-based multiple layer network, and wherein the network view comprises at least a portion of the devices or paths in the network map, and sharing the network view with the application.

In another aspect, the disclosure includes an apparatus comprising a processor configured to monitor a plurality of network devices underlying a SDN, create a network map comprising a representation of the topology of the network devices, create at least one network view comprising less than all of the network devices and network paths comprised within the network map, share the at least one network view with an application.

In yet another aspect, the disclosure includes a computer program product comprising computer executable instructions stored on a non-transitory medium that when executed by a processor cause the processor to assess a network map for one or more capabilities, wherein the network map comprises a representation of a plurality of network devices and network paths in a SDN-based multiple layer network, select a plurality of network devices from the network map for inclusion in a network view, wherein the plurality of network devices is less than the total number of network devices in the network map, create a network view, and share the network view with at least one application

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed are the methods of representing SDN-based multiple layer network topology "views", e.g., logical or "virtualized" representations of the network of the underlying hardware devices. These topological views may be developed from a larger "network map" containing the full panoply of network information. As used herein, the term "network map" may mean a virtual representation of the underlying network topology, state information, dynamic traffic flow/volume information, and/or other network state information stored in a computer memory, and may include the real-world transmission performance capabilities of the underlying network nodes, e.g., bandwidth, latency, port capability, jitter, etc., as well as the real-world links between the network nodes. SDNs may provide applications with topological views, also referred to herein as network views, of the underlying networks. As used herein, the term "network view" may mean a logical representation of at least a portion of a whole network map, e.g., a subnet, stored on a computer memory and transmittable between devices, e.g., an SDN controller and an application running on a computer device. The network views may be represented based on multiple layer virtualized SDNs. Based on the network views, user applications may define their own data flow paths, also called network paths or links, in the SDN. Using these network views, user applications may define data flow paths and may operate the simplified subnet views provided by the SDN more efficiently. SDN controllers may interact with NOSs, may collect network information for user applications, and may provide applications with various views, e.g., global network topology views, network views, services views, resource views, and/or subnet views.

Whereas traditional virtualized networks are static-configured and fixed for applications, the disclosed approach may allow dynamic allocation of virtualized subnets to applications based on the applications' needs using minimum system resources. This may save system resources per applications and let different applications share whole network resources in maximum. The views defined according to the disclosure may be dynamically created and destroyed, making network utilization more efficient and flexible. This may also permit user application to cease handling complicated network controls as in normal networks.

Figure 1:
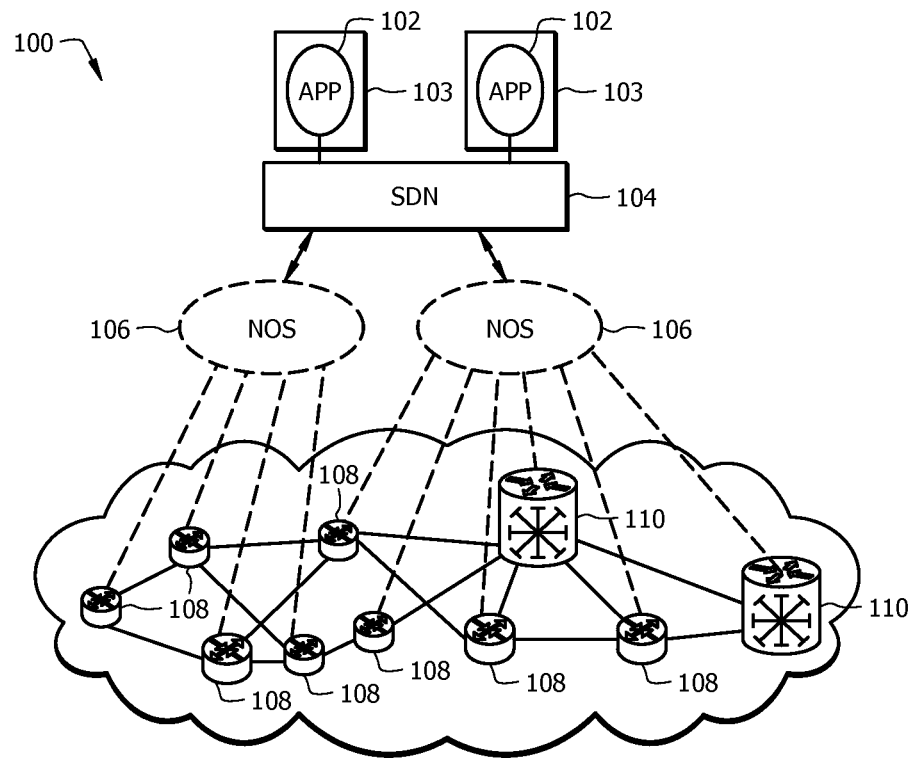
FIG. 1 is an illustration of an embodiment of an SDN architecture.

FIG. 1 is an illustration of an embodiment of an SDN architecture 100. Applications 102, e.g., software programs, hosted on devices 103, e.g., video servers, may communicate with SDN controller 104 through SDN API connections facing the applications 102. The SDN controller 104 may be configured to perform control path and/or control plane functionality, such as drawing a "network map" (described herein) and defining the information in a routing table that defines what to do with incoming packets (described herein). The SDN controller 104 may be configured for management and control functionality of the control plane, which may include routing and resource management. The SDN controller 104 may include SDN management software modules (not depicted), and may communicate with lower layer NOSs 106. NOSs 106 may be hosted on the same device as the SDN controller or a different device, and may monitor and control the underlying network components 108, which may be any components configured to receive and/or transmit data through the data network, e.g., routers, switches, servers, etc. The control path is represented by dashed lines, and the data path is represented by solid lines. Forwarding devices 110 may be hardware network devices capable of forwarding data packets and communicating with NOSs 106. The NOSs 106 may provide an abstraction layer between network components 108 and forwarding devices 110 on one side and the SDN controller 104 on the other, may be coupled to the network components 108 and forwarding devices 110, and may communicate with the network components 108 and forwarding devices 110, e.g., via OpenFlow defined protocols on OpenFlow controllers. The NOSs 106 may possess comprehensive topology knowledge and resource information with respect to the underlying network components 108. The NOSs 106 may pass this information to the SDN controller 104, which may be maintained by the SDN controller 104 as a network map. With a network map, the SDN controller 104 may make decisions on how to assign resources and route different application/information flows through the SDN architecture 100.

Figure 2:
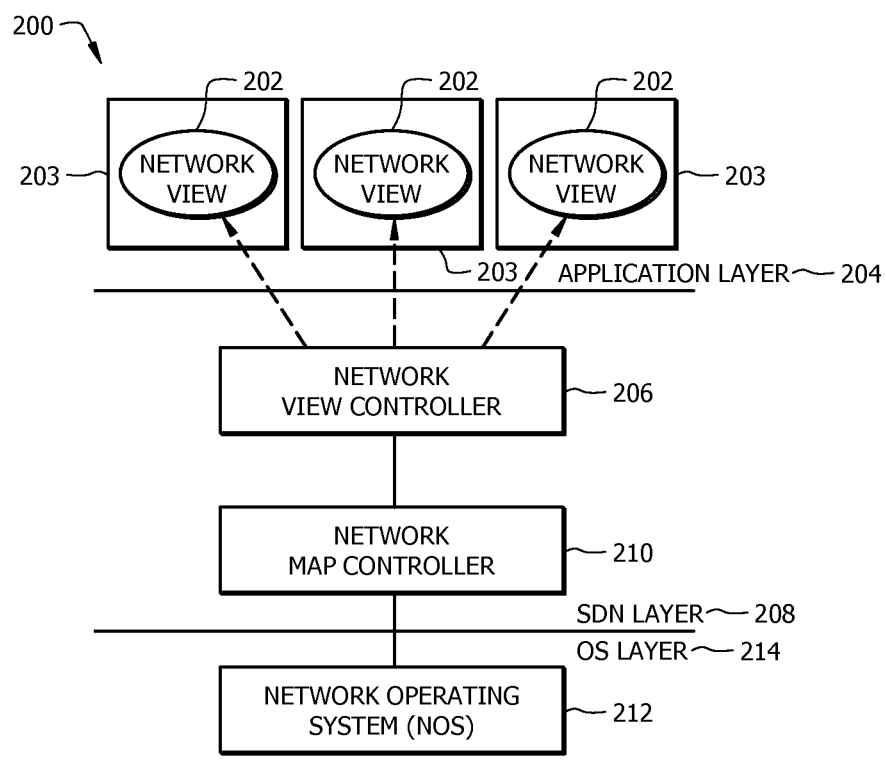
FIG. 2 further details an embodiment of an SDN architecture.

FIG. 2 further details an illustrative embodiment of an SDN architecture 200, e.g., SDN architecture 100 of FIG. 1. FIG. 2 shows network views 202 stored on devices 203, e.g., devices 103 of FIG. 1, residing in the application layer 204. The SDN layer 208, e.g., SDN controller 104 of FIG. 1, may comprise Network View Controller 206, which may create and send network views 202 to devices 203, e.g., in response to a request made from the application layer 204. The Network View Controller 206 may also manage and destroy network views 202. The Network View Controller 206 may allocate the system resources to devices 203 via the network views 202, e.g., by selectively including certain network components, network devices, network paths, etc., and excluding others from the network views 202, and may reclaim these system resources upon destroying the network views 202. The SDN layer 208 may also comprise a Network Map Controller 210. The Network View Controller 206 may coordinate requests for network views 202 with the Network Map Controller 210. Network Map Controller 210 may create, manage, and destroy one or more network maps. The Network Map Controller 210 may communicate with the NOS 212, e.g., NOSs 106 of FIG. 1, in the OS layer 214. As stated above, NOS 212 may provide an abstraction layer between network nodes the SDN layer 208.

Figure 3:
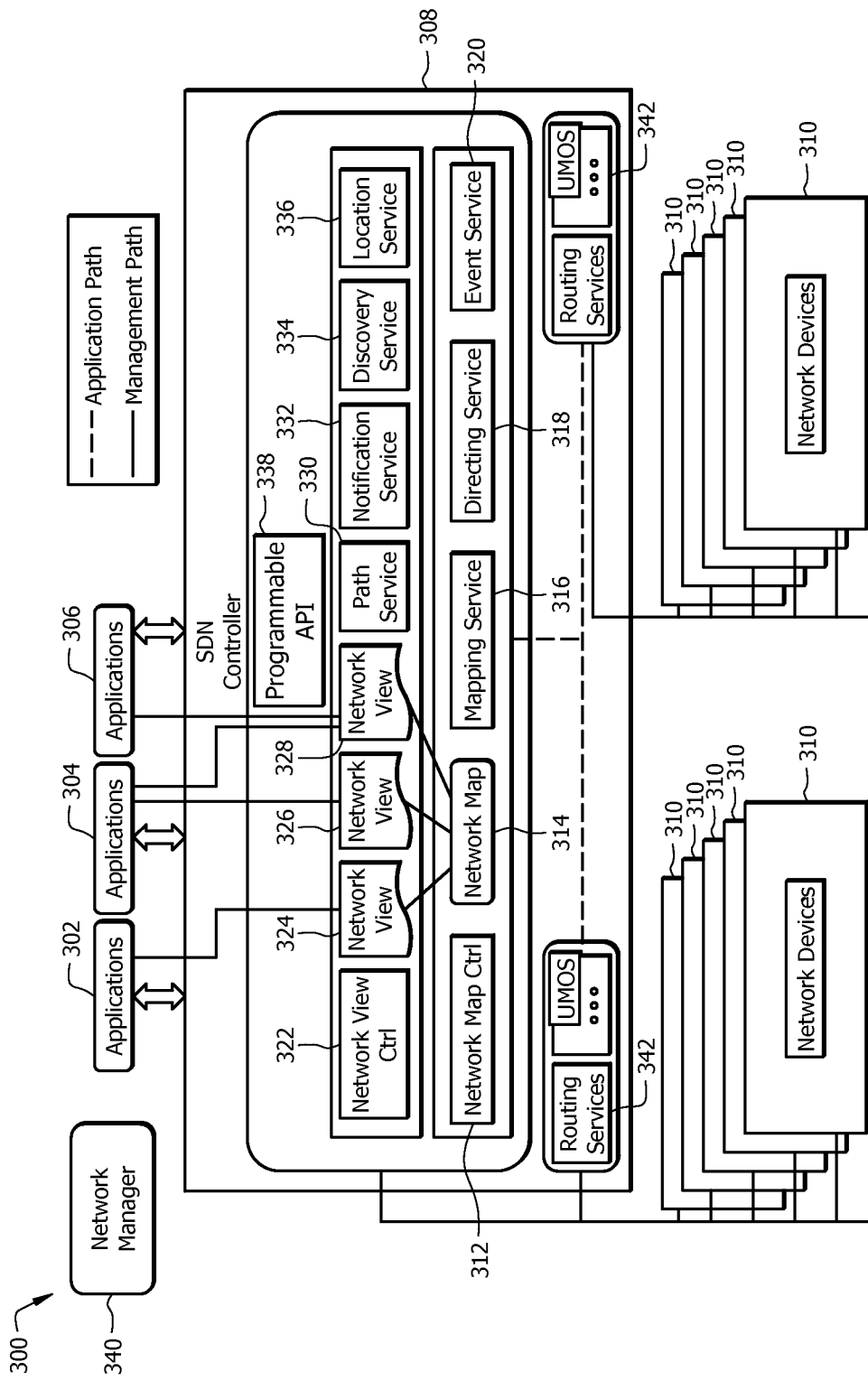
FIG. 3 further details an embodiment of an SDN controller in an SDN architecture.

FIG. 3 is an illustration of still another embodiment of an SDN architecture 300, e.g., SDN architecture 200 of FIG. 2. FIG. 3 shows applications 302-306, e.g., applications 102 of FIG. 1, in communication with an SDN controller 308, e.g., SDN controller 104 of FIG. 1. The SDN controller 308 may be in communication with network devices 310, e.g., network components 108 and/or forwarding devices 110 of FIG. 1.

The SDN controller 308 may comprise a Network Map Controller 312, e.g., Network Map Controller 210 of FIG. 2, which may identify and store the global network topology in a map. The Network Map Controller 312 may comprise a Network Map Element 314, a Mapping Services Element 316, a Directing Services Element 318, and an Event Services Element 320. Network Map Element 314 may store the network map. Mapping Services Element 316 may receive input from the network devices for updating the network map, e.g., adding a new node to the physical network topology stored in Network Map Element 314. Directing Services Element 318, which may be provided by a NOS, e.g., NOS 206 of FIG. 2, may let applications 402-406 directly setup forwarding path, e.g., by allowing the applications 402-406 to make routing decisions rather than the routing protocol. Event Services Element 320 may monitor the function of one or more network paths and/or network devices and may inform the Network Map Controller 312 of event-based changes, e.g., a failed link or component.

The SDN controller 308 may further comprise a Network View Controller 322, e.g., Network View Controller 206 of FIG. 2, which may select network views, e.g., network views 202 of FIG. 2, from the global network topology or network map to serve to applications 302-306. The Network View Controller 322 may comprise a Network View Element 324, a Network View Element 326, a Network View Element 328, a Path Services Element 330, a Notification Services Element 332, a Discovery Services Element 334, and a Location Services Element 336. Network View Elements 324-328 may store discrete network views comprising at least a portion of the network map devices and/or paths, or, in some embodiments, alternate network views, from Network Map Element 314 and may be in communication with Applications 302-306, e.g., via a programmable API or Controller Interface 338, which may be an interface engine for exchanging data between, e.g., APIs at applications 302-306 and the Network View Elements 324-328. As shown in FIG. 3, a single network view stored at a Network View Element, e.g., Network View Element 324, may service a single application, e.g., application 302. Similarly, a single application, e.g., application 304, may have access to network views stored at multiple Network View Elements, e.g., Network View Elements 326 and 328. Similarly, a single network view stored at a single Network View Element, e.g., Network View Element 328, may service multiple applications, e.g., applications 304 and 306. This sharing may be managed by the Network View Controller 322. The sharing of network views by multiple applications or multiple applications sharing the same network view may optionally be visible to the applications which are using them separately, e.g., using Virtual Local Area Network (VLAN) or Virtual Private Network (VPN) techniques according to network configurations. The connections between Network View Elements 324-328 and applications 302-306 are illustrative of the interactions permissible and are not limiting, as would be understood by one of skill in the art. Path Services Element 330 may identify one or more available paths between devices on the physical network and passing the information to the Network View Controller 322 so that appropriate network views may be selected for the requesting application. Notification Services Element 332 may interface with the applications 302-306 to inform the applications 302-306 of events and/or changes in the relevant network view(s) and/or underlying physical network. Discovery Services Element 334 may identify services that the network may provide in the network view. Location Services Element 336 may find the service location and one or more preferred paths for reaching the service location.

Returning to network maps, a network map and/or network topology may be a complete representation of the physical network managed under the Network Map Controller 312 e.g., comprising network components 108 and/or forwarding devices 110 of FIG. 1. Network maps may include communications links, bandwidth, latency, port capability, etc., of the physical network, e.g., network components 108 and/or forwarding devices 110 of FIG. 1. Network maps may comprise nodes representing the physical devices and links representing the connections between the physical devices. Nodes may be direct maps of nodes or may be representations of, e.g., a subnet in a map. Each node may have a node name assigned by the Network View Controller 322 or, in some embodiments, by querying a policy database where names may be defined by a Network Manager 340. Network Manager 340 may be a program for providing detection and configuration for systems to automatically connect to network, as well known in the art. Links may be direct maps of paths between nodes, may be tunnels, e.g., virtual links, between nodes, or may be abstractions of logical paths between nodes. Links may represent multiple parallel connections between nodes, and may be represented by the link's attributes or capabilities. The SDN Controller 308 may further comprise an element for Routing Services 342 for interfacing with and finding connectivity within the network, e.g., network devices 310, which element may comprise a Universal Message Object (UMO) API and/or NOS.

Network View Elements 324-328 may comprise select portions of the global network map, e.g., as apportioned by the Network View Controller 322. The Network View Controller 322 may ensure that the Network View Elements 324-328 are compatible with the requests of the applications 302-306. For example, if a link in a network view is a virtual link over multiple network nodes, e.g., a tunnel or abstraction of a logical path between network nodes, the Network View Controller 322 may ensure that the virtual link does not include any loops. Network View Elements 324-328 may include node and link capabilities. Node capability may be the physical routing device's capability as monitored by, e.g., Mapping Services Element 316, or may be any abstract capability defined by the map and Network View Controller 322. Link capability may be the physical link's capability as monitored by, e.g., Mapping Services Element 316, or may be any abstract capability defined by the map and Network View Controller 322. Link capability may be a direct mapping of the link capability if it may be a direct mapping of a link in map. Link capability may be a tunnel capability that may be the minimum of all capabilities between two nodes. Link capability may be a combination of multiple parallel connections between nodes, equal to, or less than, the summation of the combined link capabilities. Link capability may be classified or reclassified by the Network View Controller 322 based on the application 302-306 request and/or current network map status. For example, if a network map link has a 10 gigabits per second (G) bandwidth capacity, the mapped link in view may be 2G or 8G, etc. depending on, e.g., actual conditions in the network, etc. If a link has a latency of 1 millisecond (ms), then the mapped link in the network view passed to the application may have 2 ms according to Network View Controller 322.

Network View Elements 324-328 may be created at the request of an application 302-306. Applications 302-306 may provide some special requirements on the network view, e.g., minimum capabilities of the nodes and/or links. Network View Controller 322 may create the network view according to such requirements coupled with the currently available resources. Network View Controller 322 may assign a network view ID to newly created network views and may allocate system resources to the view, e.g., Network View Elements 324-326. If the application places no special requirement on the requested network view, Network View Controller 322 may create a network view based on currently available network resources and default management policies. Once created, the Network View Controller 322 may return the view to application. When the application no longer requires the view, it may request that the Network View Controller 322 destroy the network view. Network View Controller 322 may then reclaim all network resources allocated to the network view. In embodiments with isolated network view sharing, isolated network views may form complete sub-network systems permitting additional functionality, e.g., users may build network management and control modules in such network views.

Figure 4A:
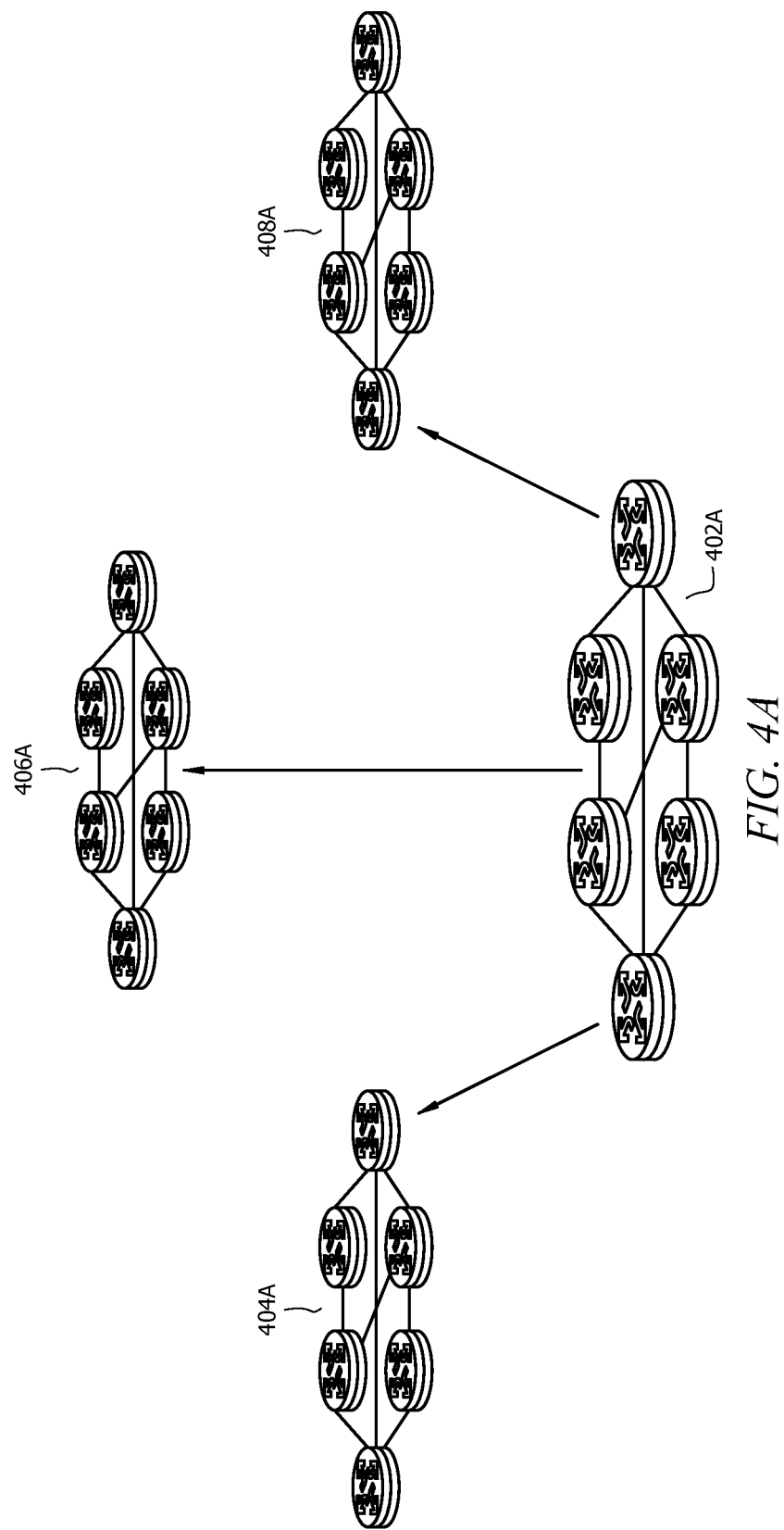
FIG. 4A is an exemplary network view with logically segregated network devices.
Figure 4B:
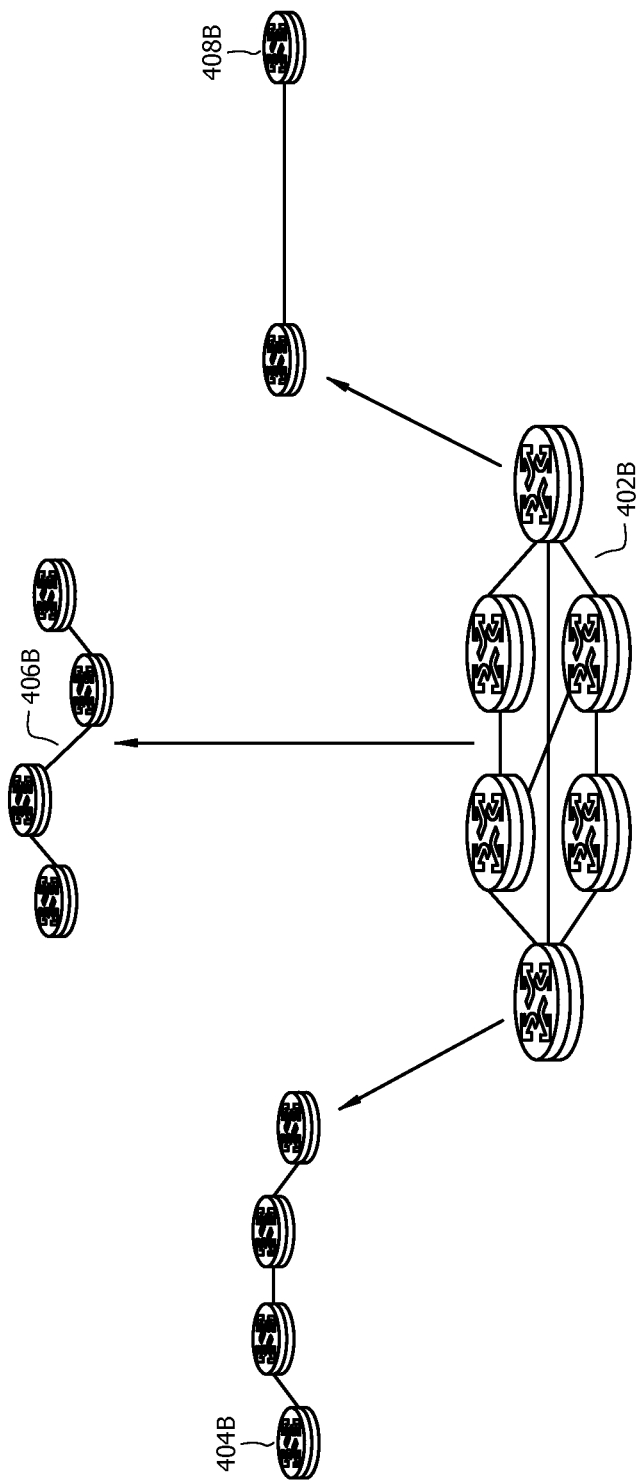
FIG. 4B is an exemplary network view with physically segregated network devices.

FIGS. 4A and 4B are network views associated with an embodiment of an SDN architecture, e.g., SDN architecture 300 of FIG. 3. FIG. 4A is a series of exemplary network views developed by logically segregating or "slicing" network devices 402A, e.g., network components 108 and/or forwarding devices 110 of FIG. 1, vertically. In other words, the network views may share the identical network devices, but may be limited in doing so in manner defined by the network view. Network view 404A may be associated with a voice application, e.g., application 302 of FIG. 3. Network view 406A may be associated with a web application, e.g., application 304 of FIG. 3. Network view 408A may be associated with a video application, e.g., application 306 of FIG. 3. Network views 404A-408A may allocate resources in network devices 402A based on various considerations, e.g., priority ranking based on reliability requirements, or may allocate resources based on other considerations, e.g., apportioning each view 33.3% of each network device's resources.

FIG. 4B is a series of exemplary network views developed based on a physical segregation of network devices 402B. The components of network devices 402B may be the same as the components of 402A. Network view 404B may be associated with a voice application, e.g., application 302 of FIG. 3. Network view 406B may be associated with a web application, e.g., application 304 of FIG. 3. Network view 408B may be associated with a video application, e.g., application 306 of FIG. 3. Network views 404B-408B may allocate resources in network devices 402B based on various considerations, e.g., priority ranking based on reliability requirements. As shown, some network devices may be shared by multiple network views while others may be isolated by the various network views.

Figure 5:
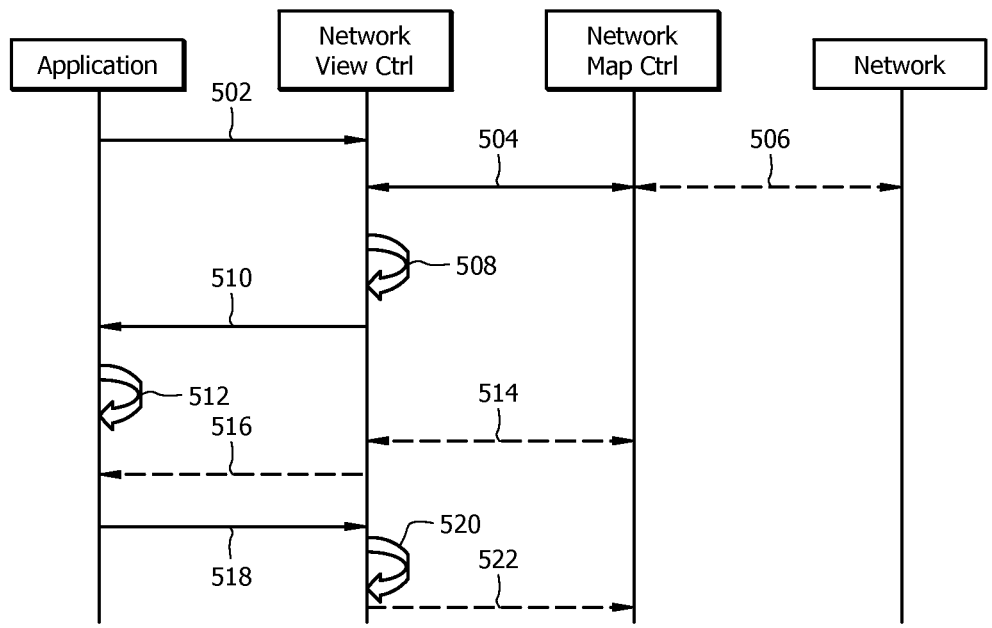
FIG. 5 is a process diagram describing a process of creation, maintenance, and destruction of a network view in an embodiment of an SDN architecture.

FIG. 5 is a process diagram describing a process of creation, maintenance, and destruction of a network view in an embodiment of an SDN architecture, e.g., SDN architecture 300 of FIG. 3. In FIG. 5, solid lines show steps which may occur in every instance of this embodiment, while dashed lines show steps which may conditionally or optionally occur. At 502, an application, e.g., applications 302-306 of FIG. 3, may request a network view with certain pre-defined constraints, e.g., minimum 5G bandwidth, from a network view controller, e.g., Network View Controller 322 of FIG. 3, at an SDN controller, e.g., SDN controller 308 of FIG. 3, via a controller interface, e.g., Controller Interface 338 of FIG. 3. Upon receiving the request, at 504 the network view controller may review a network map controlled by a network map controller, e.g., Network Map Controller 312 of FIG. 3. Dashed line 506 illustrates that network map controller may continuously or periodically monitor the network, e.g., network devices 402B of FIG. 4, underlying the network map, e.g., using elements for mapping services, directing services, and event services, e.g., Mapping Services Element 316, Directing Services Element 318, and Event Services Element 320 of FIG. 3, and may continuously or periodically update the network map based on the results of the monitoring. At 508, the network view controller may create a network view conforming to the requirements of the application and store the network view at a network view element, e.g., Network View Element 324 of FIG. 3. At 510, the SDN controller may share the network view with the application, and at 512 the application may utilize the network view to determine its own traffic routing. At 514, the network view controller may continuously or periodically monitor the network map for one or more associated metrics, e.g., bandwidth, latency, port capability, new devices, failed links, etc., using, e.g., path services, notification services, discovery services, and location services, e.g., Path Services Element 330, Notification Services Element 332, Discovery Services Element 334, and Location Services Element 336 of FIG. 3, and may update one or more network views accordingly. At 516, the one or more updated network views may be shared with applications continuously, periodically, or on an as-needed basis. At 518, the application may inform the SDN controller that the network view is no longer required. At 520, the SDN controller may delete the network view and, at 522, the SDN controller may reevaluate the resources returned to the network map to determine whether an update to one or more additional network views is required.

Figure 6:
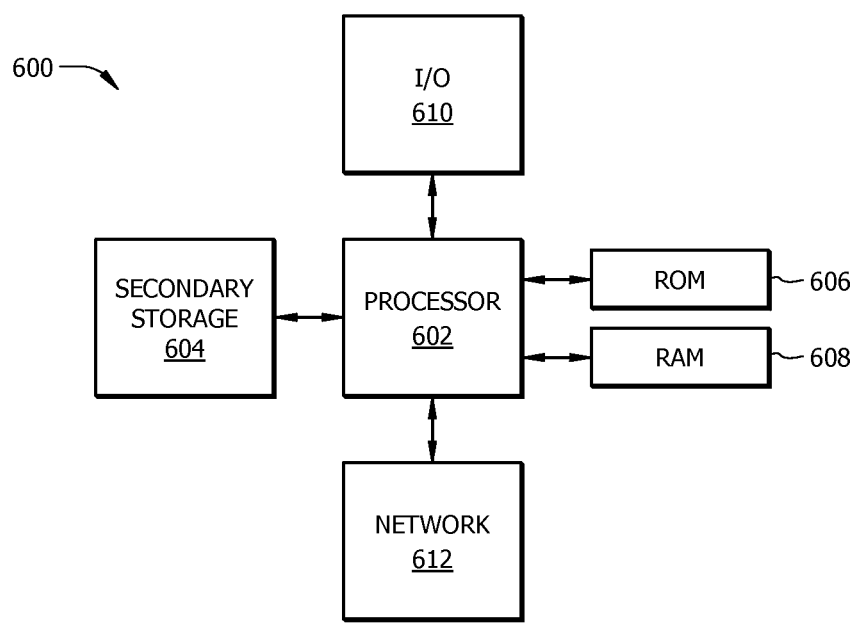
FIG. 6 illustrates an embodiment of a network node.

At least some of the features/methods described in the disclosure may be implemented in a general computing device and/or a network apparatus or component, such as a computer or network component with sufficient processing power, memory resources, and network throughput capability to handle the necessary workload placed upon it. For instance, the features/methods of the disclosure may be implemented using hardware, firmware, and/or software installed to run on hardware. FIG. 6 illustrates a typical, general-purpose network component 600 suitable for implementing one or more embodiments of the components disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, e.g., cameras, microphones, display screens, etc., and network connectivity devices 612. The processor 602 may be implemented as one or more CPU chips, or may be part of one or more application specific integrated circuits (ASICs) and/or digital signal processors (DSPs).

The secondary storage 604 is typically comprised of one or more disk drives or erasable programmable ROM (EPROM) and is used for non-volatile storage of data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

It is understood that by programming and/or loading executable instructions onto the general computing device 600, at least one of the processor 602, the ROM 606, and the RAM 608 are changed, transforming the general computing device 600 in part into a particular machine or apparatus, e.g., a video codec, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hard-wires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. All documents described herein are incorporated herein by reference.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for network control, comprising:
   receiving a request for a network view from an application at a Software Defined Network (SDN) controller, wherein the request comprises at least one minimum performance requirement;
   assessing a network map for one or more capabilities, wherein the network map comprises a representation of a plurality of network devices and network paths in a SDN-based multiple layer network;
   creating the network view;
   allocating network resources to the network view by apportioning a portion of a plurality of network devices, a portion of a plurality of network paths, and a portion of a plurality of network components in a SDN-based multiple layer network to the network view based on one or more transmission performance capabilities satisfying the minimum performance requirement, wherein the portion of the network devices apportioned to the at least one network view comprises less than all of the network devices that are represented in the network map; and
   sharing the network view with the application.

2. The method of claim 1, wherein the network view is shared with a plurality of applications.

3. The method of claim 1, further comprising:
   monitoring the network devices, the network paths, or both;
   updating a network map to reflect changes in the network devices, the network paths, or both, wherein the network map comprises a representation of a plurality of network devices and a plurality of network paths in a SDN-based multiple layer network; and
   reapportioning a second portion of the network devices, a second portion of the network paths, and a second portion of the network components assigned to the network view based on updates to the network map.

4. The method of claim 3, wherein the network map comprises a plurality of alternate network views.

5. The method of claim 3, further comprising:
   receiving a notice to terminate the network view;
   terminating the network view; and
   updating the network map based on the termination of the network view.

6. The method of claim 1, wherein the portion of the network devices, the portion of the network paths, and the portion of the network components are apportioned to the network view based on one or more transmission performance capabilities satisfying default management policies when the request does not include the at least one minimum performance requirement.

7. An apparatus comprising:
   a memory;
   a processor coupled to the memory and configured to:
      monitor a plurality of network devices underlying a Software Defined Network (SDN);
      create a network map comprising a representation of a topology of the network devices;
      receive a request for at least one network view from an application, wherein the request comprises at least one minimum performance requirement;
      allocate network resources to the network view by apportioning a portion of the network devices to the at least one network view based on one or more transmission performance capabilities satisfying the at least one minimum performance requirement, wherein the portion of the network devices apportioned to the at least one network view comprises less than all of the network devices that are represented in the network map; and
      share the at least one network view with the application.

8. The apparatus of claim 7, wherein the one or more transmission capabilities are selected from a group consisting of: bandwidth, latency, port capability, and jitter.

9. The apparatus of claim 7, wherein the portion of the network devices apportioned to the at least one network view satisfy the at least one minimum performance requirement.

10. The apparatus of claim 7, wherein the at least one network view is shared with a plurality of applications.

11. The apparatus of claim 7, further comprising at least two network views, and wherein the at least two network views are shared with the application.

12. The apparatus of claim 7, wherein the processor is further configured to:
   receive a notice to terminate the at least one network view network view;
   terminate the at least one network view; and update the network map based on the termination of the at least one network view.

13. The apparatus of claim 7, wherein the processor is further configured to:
   update the network map based on changes in the network devices; and
   update the at least one network view based on changes in the network map.

14. The apparatus of claim 7, wherein the portion of the network devices are apportioned to the network view based on one or more transmission performance capabilities satisfying default management policies when the request does not include the at least one minimum performance requirement.

15. A computer program product comprising computer executable instructions stored on a non-transitory medium that when executed by a processor cause the processor to perform the following:
   receive a request for a network view from at least one application, wherein the request comprises at least one minimum performance;
   assess a network map for one or more capabilities, wherein the network map comprises a representation of a plurality of network devices and network paths in a Software Defined Network (SDN)-based multiple layer network;
   create the network view;
   allocate network resources to the network view by assigning a portion of the network devices represented in the network map exclusively to the network view based on one or more transmission performance capabilities such that the portion of the network devices assigned to the network view conforms to the at least one minimum performance requirement, wherein the portion of the network devices is less than a total number of network devices represented in the network map; and
   share the network view with the at least one application.

16. The computer program product of claim 15, wherein the instructions further cause the processor to:
   monitor a network layer at an SDN layer, wherein the network layer comprises network devices and network paths; and
   update the network map to reflect changes in the network layer.

17. The computer program product of claim 15, wherein the one or more transmission capabilities are selected from a group consisting of: bandwidth, latency, port capability, and jitter.

18. The computer program product of claim 15, wherein the network view is shared with a plurality of applications.

19. The computer program of claim 15, wherein the instructions further cause the processor to:
   monitor the plurality of network devices;
   update the network map based on changes in the plurality of network devices; and
   reassign a second portion of the network devices to the network view based on changes in the network map.

20. The computer program product of claim 15, wherein the portion of the network devices are assigned to the network view based on one or more transmission performance capabilities such that the portion of the network devices assigned to the network view conform to default management policies when the request does not include the at least one minimum performance requirement.

* * * * *